Figure 1:
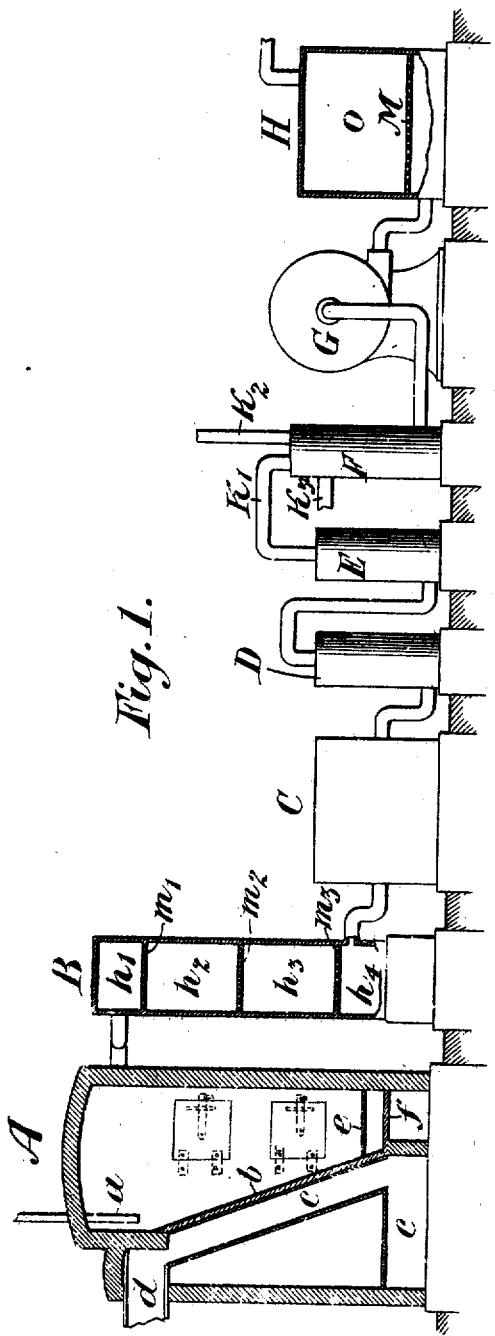

J. S. & A. A. BLOWSKI.
PROCESS OF RECOVERING SULFURIC ACID FROM ACID SLUDGE
APPLICATION FILED JAN. 23, 1911.

1,010,221.

Patented Nov. 28, 1911.

UNITED STATES PATENT OFFICE.

JOHN S. BLOWSKI AND ALFRED A. BLOWSKI, OF OAKLAND, CALIFORNIA.

PROCESS OF RECOVERING SULFURIC ACID FROM ACID SLUDGE.

1,010,221.  Specification of Letters Patent.  Patented Nov. 28, 1911.

Application filed January 23, 1911. Serial No. 604,183.

*To all whom it may concern:*

Be it known that we, JOHN S. BLOWSKI and ALFRED A. BLOWSKI, citizens of the United States, residing at Oakland, in the county of Alameda and State of California, have invented certain new and useful Improvements in Processes for the Treatment of Sulfuric-Acid Residues; and we do hereby declare the following to be a full, clear, and exact description of the invention, such as will enable others skilled in the art to which it appertains to make and use the same.

Our invention has reference to improvements in processes for the recovery of sulfuric acid and more particularly for the recovery of sulfuric acid used in the refining of petroleum.

In the treatment of petroleum distillate with sulfuric acid or sulfuric anhydrid, a sludge is obtained which consists largely of sulfuric acid chemically combined with tarry and other organic matters. For the recovery of the sulfuric acid from this sludge, it has hitherto been treated with steam or with water in lead lined retorts. This treatment results in the separation of the sludge into a tarry mass and a dilute and impure sulfuric acid which separates out at the bottom. This impure acid usually termed "weak acid" or "sludge acid" has hitherto been concentrated in lead and iron pans before being again used, but this process for the recovery of the sulfuric acid has been found unsatisfactory for the following reasons:—A considerable part of the sulfur values contained in the original acid has escaped into the atmosphere as sulfur dioxid during the treatment of the petroleum and of the sludge owing to a variety of reactions, and again during the concentration of the sludge acid, in the latter case owing primarily to reduction by the organic matter that is present. The acid recovered by this process has been largely contaminated with tarry matters, the final product being black and unsaleable for most purposes.

It has been proposed to convert the sludge into sulfuric acid, without said separation and concentration, by decomposing it directly into gaseous products with heat, and utilizing said gaseous products for the production of sulfuric acid; but this method necessitates the removal of large amounts of gaseous organic substances from the main body of gas, involving an elaborate purifying system; it requires the use of excessive amounts of fuel, and also causes the loss of much or all of the tarry matters obtained in the separation of the sludge acid, which are valuable for fuel and other purposes.

The object of the present invention is not only to overcome the foregoing objections to the manner of recovering the sulfuric acid in the sludge but also to afford a means of converting the recovered sulfur values into sulfuric anhydrid if desired.

By the process hereinafter described, we are enabled to make use of most of the sulfur values present in the sludge or which have hitherto escaped into the atmosphere and we are enabled to convert said sulfur values into a good merchantable form either as sulfuric acid or sulfuric anhydrid.

Our process consists in the treatment of the sludge with steam or water as heretofor with the production of a "weak acid" or sludge acid, the decomposition of said sludge acid, containing organic matters, by heat with the resultant formation of gas containing sulfur dioxid, the addition to said current of gas of any other sulfur dioxid obtained during the treatment of petroleum or sludge and the conversion of such sulfur dioxid into sulfuric acid or sulfuric anhydrid by any appropriate means.

In the initial treatment of the sludge, an amount of water either in the form of cold water or steam equal to about fifty per cent. in volume of the amount of sludge treated is added to the sludge. After the separation of the sludge acid which consists principally of diluted acid with some organic matter, said sludge acid is decomposed with the formation of water, sulfur dioxid, carbon dioxid and small amounts of other substances, the decomposition being produced by heating the sludge acid to sufficient temperature to cause the reduction of the sulfuric acid by the organic matter present. The temperature required for such decomposition of the sludge acid is in practice about 300 C. though considerable decomposition will take place before this temperature is reached and it is not uncommon to considerably exceed this temperature. The reduction of the sulfuric acid by the organic matter remaining in the sludge acid is of course quicker the higher the temperature. The gas produced is then filtered to remove any solid particles, after which it is cooled, the excess of water condensing out in this process; the gas is then further purified by scrubbing with water and strong acid which removes organic impurities. For the ultimate conversion of the sulfur dioxid into trioxid, a predetermined amount of dry air is mixed with the sulfur dioxid. This process allows the admixture of any sulfur dioxid liberated in the treatment of petroleum or sludge with the mass of sulfur dioxid obtained from the decomposition of the sludge acid.

Having now a gas containing sulfur dioxid and free from undesirable contamination, the sulfur dioxid therein may be converted into sulfuric acid or anhydrid by any of the well known methods, such as the chamber or contact processes which need not be more fully described here.

To carry out the process hereinbefore described, we show an apparatus by means of which the sludge acid may be decomposed and the resulting sulfur dioxid be prepared for oxidation, according to our invention.

Figure 2:
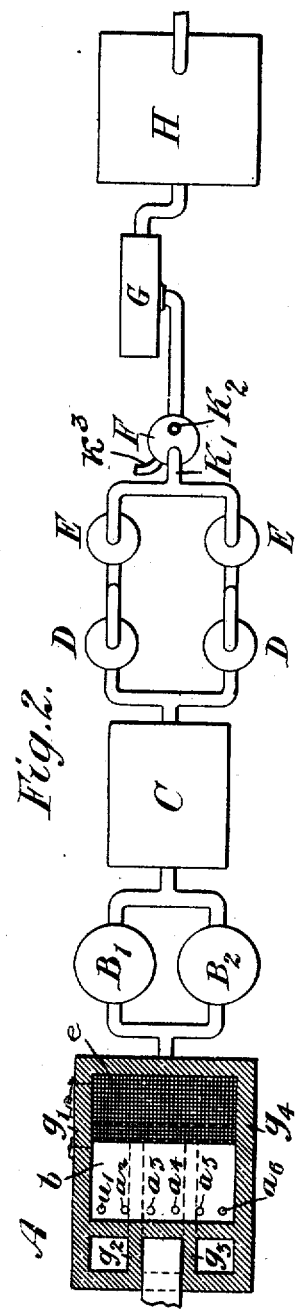

Figure 1 shows in outline an elevation partly in section of such an apparatus, Fig. 2 being a plan thereof also partly in section.

The sludge acid is introduced into the decomposing chamber A in small streams, through the pipes $a$, dropping on the iron or fire tile hearth $b$. The plates, of which the hearth $b$ consists, are kept hot by a fire, from oil or other fuel, burning in the combustion chamber $c$ which leads to the flue $d$. The plates $b$ are supported by a brick wall of the chamber $g_1$ and $g_4$ and by outer walls $g_2$ and $g_3$ placed between the outer walls, and dividing the combustion chamber into three parts. The sides of the decomposing chamber are provided with doors, allowing access to the interior, and permitting any scraping or cleaning of the plates during operation. Below the plates is an iron grate $e$, retaining most of the solid matter dropping upon it, but allowing any liquid to fall onto the hearth $f$ to be further heated by a fire. The residue from either the grate or the hearth may be periodically removed through the doors on the sides.

The gas produced travels into the filter towers B, made of terra cotta material. Each tower consists of sections $h_1$, $h_2$, and $h_3$, and $h_4$, of which $h_2$ and $h_3$ are filled with coke, the several sections being separated by perforated terra cotta plates $m_1$, $m_2$ and $m_3$. The filtered gas flows through the condenser C where the bulk of the water is removed. This gas is then scrubbed with water in scrubbers D, and with strong acid in scrubbers E, in which the bulk of the active organic matter is removed. After this purification the gas is mixed with dried air, and also if desired with similarly purified gases from agitators or sludge retorts, in mixing chamber F, pipe $k_1$ introducing the main body of gas as previously treated, $k_2$ introducing dried air, and $k_3$ introducing purified gases from agitators or retorts. From the mixing chamber the gases are drawn into the fan G and propelled from it through the filter H, having a grate M, the space $o$ above the grate being filled with coke. This filter catches any acid that may have been carried from the scrubbers. From this filter the gases pass through any suitable apparatus for oxidizing the sulfur dioxid to sulfuric anhydrid or sulfuric acid. Such apparatus may be a chamber system, a platinum contact or iron oxid contact system, or any combination of these that may be most suitable under the circumstances.

What we claim is:—

1. The process, which process comprises treating petroleum sludge by separating the sulfuric acid therefrom in a dilute and impure condition and subsequently decomposing the acid so liberated by means of heat.

2. The process, which process comprises treating petroleum sludge by liberating the sulfuric acid therefrom in a dilute condition by means of water and subsequently decomposing said acid by means of heat and the organic matter remaining in said acid.

3. The process, which process comprises treating petroleum sludge by liberating the sulfuric acid therefrom by means of water so that a dilute liquid is obtained containing sulfuric acid and sufficient organic matter to decompose said sulfuric acid and subsequently decomposing said sulfuric acid in the presence of said organic matter by means of heat.

4. The herein described process, which process comprises treating petroleum sludge by removing the excess of organic matter by means of water and treating the diluted sulfuric acid containing a small amount of organic matter by heat so as to decompose said sulfuric acid into sulfurous acid.

5. The process of making sulfuric acid which consists in liberating the sulfuric acid from petroleum sludge in a dilute condition by means of water, heating said acid in the presence of organic matter contained in said sludge so as to produce sulfur dioxid, purifying said sulfur dioxid and subsequently reoxidizing said sulfur dioxid so as to produce sulfuric acid.

6. The herein described process which comprises the decomposition of sludge acid by means of heat and a small percentage of organic matter present in said sludge acid so as to produce sulfur dioxid and the subsequent reoxidation of said sulfur dioxid to sulfur trioxid.

7. The herein described process, which process comprises treating petroleum sludge by diluting same with water so as to produce sludge acid, removing the excess of tarry matter obtained by such dilution and not required for the reduction of the sulfuric acid remaining in the sludge acid so produced and subsequently decomposing said sludge acid by means of heat and the organic matter remaining in said sludge acid.

In testimony whereof we affix our signatures in presence of two witnesses.

JOHN S. BLOWSKI.
ALFRED A. BLOWSKI.

Witnesses:
WM. HODGKISS,
ERNEST M. BLAESS.

Copies of this patent may be obtained for five cents each, by addressing the "Commissioner of Patents, Washington, D. C."